(12) United States Patent
Fisher et al.

(10) Patent No.: US 9,394,866 B2
(45) Date of Patent: Jul. 19, 2016

(54) FUEL SUPPLY SYSTEM AND METHOD

(71) Applicant: Robert Bosch GmbH, Stuttgart (DE)

(72) Inventors: Paul E. Fisher, Brighton, MI (US); Paul Mason, Dearborn, MI (US)

(73) Assignee: Robert Bosch GmbH, Stuttgart (DE)

( * ) Notice: Subject to any disclaimer, the term of this patent is extended or adjusted under 35 U.S.C. 154(b) by 243 days.

(21) Appl. No.: 14/015,417

(22) Filed: Aug. 30, 2013

(65) Prior Publication Data

US 2014/0060682 A1  Mar. 6, 2014

Related U.S. Application Data

(60) Provisional application No. 61/695,138, filed on Aug. 30, 2012.

(51) Int. Cl.
*F02M 37/00* (2006.01)
*F02M 37/02* (2006.01)
*B60K 15/03* (2006.01)
*F02M 37/10* (2006.01)

(52) U.S. Cl.
CPC ............ *F02M 37/0064* (2013.01); *B60K 15/03* (2013.01); *F02M 37/0023* (2013.01); *F02M 37/0088* (2013.01); *F02M 37/025* (2013.01); *B60K 2015/0325* (2013.01); *B60K 2015/03118* (2013.01); *B60K 2015/03138* (2013.01); *B60K 2015/03289* (2013.01); *F02M 37/0082* (2013.01); *F02M 37/10* (2013.01); *Y10T 137/86067* (2015.04)

(58) Field of Classification Search
CPC . F02M 37/00; F02M 37/0023; F02M 37/025; F02M 37/106
USPC .......................... 123/497, 505, 509–511, 514; 137/565.37
See application file for complete search history.

(56) References Cited

U.S. PATENT DOCUMENTS

| | | |
|---|---|---|
| 4,703,771 A | 11/1987 | Mimura |
| 5,197,444 A | 3/1993 | Lang et al. |

(Continued)

FOREIGN PATENT DOCUMENTS

| | | |
|---|---|---|
| JP | 2000356174 | 12/2000 |
| JP | 03708351 | 10/2005 |
| JP | 04678279 | 4/2011 |

OTHER PUBLICATIONS

International Search Report dated Dec. 3, 2013 for PCT/US2013/057590, 5 pages.

(Continued)

*Primary Examiner* — John Kwon
*Assistant Examiner* — Johnny H Hoang
(74) *Attorney, Agent, or Firm* — Michael Best & Friedrich LLP

(57) ABSTRACT

A fuel supply system includes a fuel pump configured to pump fuel from a first fuel storage location to an engine. A jet pump is configured to receive an auxiliary supply of fuel from the fuel pump and to return the auxiliary supply of fuel plus an additional flow of fuel drawn from a second fuel storage location to the first fuel storage location. A jet pump supply line has an inlet in fluid communication with an outlet of the fuel pump and has an outlet coupled to an inlet of the jet pump. A jet pump return line has an input coupled to an outlet of the jet pump and has an outlet adjacent to the fuel pump. A shut-off valve operates to selectively limit fuel flow through the jet pump return line.

18 Claims, 5 Drawing Sheets

(56) References Cited

U.S. PATENT DOCUMENTS

| | | |
|---|---|---|
| 5,417,239 A | 5/1995 | Ford |
| 5,642,719 A | 7/1997 | Brown |
| 5,732,684 A * | 3/1998 | Thompson .................. 123/514 |
| 5,983,932 A | 11/1999 | Wagner et al. |
| 6,230,691 B1 | 5/2001 | Coha et al. |
| 6,276,342 B1 | 8/2001 | Sinz et al. |
| 6,955,158 B2 * | 10/2005 | Rumpf ........................ 123/514 |
| 7,007,675 B2 | 3/2006 | Ida et al. |
| 7,051,716 B2 * | 5/2006 | Maasz ......................... 123/509 |
| 7,069,913 B1 | 7/2006 | Crary |
| 7,216,633 B2 | 5/2007 | Attwood et al. |
| 7,415,974 B2 | 8/2008 | Akiba et al. |
| 8,226,123 B2 | 7/2012 | Chino et al. |
| 8,316,885 B2 * | 11/2012 | Bauer ..................... 137/565.22 |
| 8,720,485 B2 * | 5/2014 | Mason ................... 137/565.22 |
| 2012/0204984 A1 | 8/2012 | Gebert et al. |

OTHER PUBLICATIONS

International Written Opinion dated Dec. 3, 2013 for PCT/US2013/057590, 5 pages.
US 8,029,022, 10/2011, Chino et al. (withdrawn)

* cited by examiner

FUEL SUPPLY SYSTEM AND METHOD

CROSS-REFERENCE TO RELATED APPLICATIONS

This application claims priority to U.S. Provisional Patent Application No. 61/695,138, filed Aug. 30, 2012, the entire contents of which are incorporated by reference herein.

BACKGROUND

The present invention relates to fuel tank construction and fuel supply systems for supplying fuel (e.g., to an internal combustion engine) from multiple fuel tanks. In many cases, vehicles such as heavy duty work vehicles include two separate fuel tanks for supplying fuel to an engine (e.g., diesel engine). However, a problem arises in seamlessly supplying fuel from the separate containment structures to a single engine which consumes the fuel. Although a structure such as a connection tube may be provided to establish fluid communication between the tanks for pressure balancing, the connection tube is generally positioned above a fill limit level and is not designed for continuous fuel carrying capability during operation. Thus, a conventional jet pump setup like that in a single saddle-shaped tank cannot be used to constantly supply a high flow rate of fuel from a secondary tank to a primary tank for pumping to the engine, because excess or overflow fuel in the primary side cannot freely flow back to the secondary tank.

SUMMARY

In one aspect, the invention provides a fuel supply system including a fuel pump configured to pump fuel from a first fuel storage location to an engine. A jet pump is configured to receive an auxiliary supply of fuel from the fuel pump and to return the auxiliary supply of fuel plus an additional flow of fuel drawn from a second fuel storage location to the first fuel storage location. A jet pump supply line has an inlet in fluid communication with an outlet of the fuel pump and has an outlet coupled to an inlet of the jet pump. A jet pump return line has an input coupled to an outlet of the jet pump and has an outlet adjacent to the fuel pump. A shut-off valve operates to selectively limit fuel flow through the jet pump return line.

In another aspect, the invention provides a fuel supply system that including a first fuel tank configured to contain a first volume of fuel, and a second fuel tank configured to contain a second volume of fuel separate and spaced from the first volume of fuel. A fuel pump is configured to draw fuel from the first fuel tank for supply to an engine. A jet pump is positioned in the second fuel tank, and the jet pump is coupled with a jet pump supply line from the first tank to the second tank and a jet pump return line from the second tank to the first tank. A shut-off valve is positioned in the first tank at an outlet of the jet pump return line. The shut-off valve is operable to selectively limit fuel flow through the jet pump return line from the second tank to the first tank.

In yet another aspect, the invention provides a method of supplying fuel to an engine from two separate fuel tanks. Separate volumes of fuel are stored in the first and second spaced apart fuel tanks. Fuel is pumped from the first fuel tank to supply an internal combustion engine. A first flow rate of fuel is pumped from the first fuel tank to drive a jet pump. The jet pump returns a second flow rate of fuel from the second fuel tank to the first fuel tank in excess of the first flow rate. An increase in the fuel level of the first fuel tank is sensed. The flow rate of fuel returned by the jet pump is reduced when the level of fuel in the first fuel tank is sensed to reach a threshold level.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
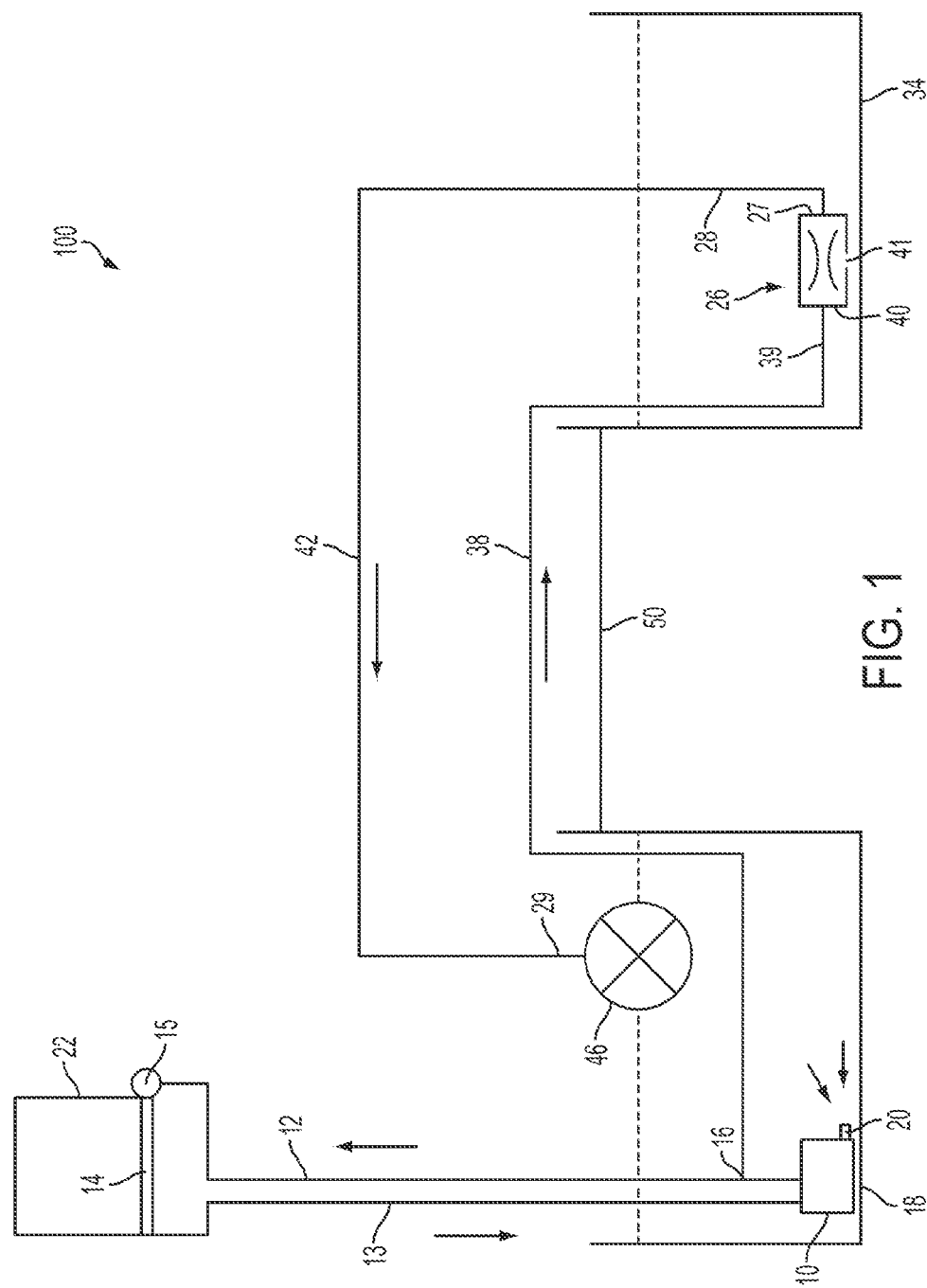
FIG. 1 is a schematic view of a fuel supply system according to one construction of the invention and including separate first and second fuel tanks, a single fuel pump located in the first fuel tank, a jet pump for drawing fuel from the second fuel tank to the first fuel tank, and a jet pump shut-off valve.

FIG. 1 illustrates a fuel supply system 100 for providing fuel (e.g., diesel fuel) from multiple distinct fuel tanks 18, 34 to a fuel-consuming device, such as an engine 22. Each of the distinct fuel tanks 18, 34 defines a separate, distinct volume for storing a quantity of fuel at a spaced apart location from the other. Fuel within the first or primary fuel tank 18 is pumped by a fuel pump 10 to the engine 22 via a fuel supply line 12. The fuel pump 10 can be an electro-mechanical device configured to create a pressure difference and drive a flow of fuel when energized. The fuel pump 10 is positioned within the first fuel tank 18 and has an inlet 20 positioned adjacent the bottom of the first fuel tank 18. In some constructions, fuel is pumped from the fuel pump 10 (e.g., a primary or in-tank pump) to a secondary ("high pressure") fuel pump 15 into a common fuel rail 14 that supplies fuel to the engine 22 for combustion via a plurality of injectors (not shown). Fuel in excess of the engine demand is returned to the first fuel tank 18 by a fuel return line 13. A connection tube 50 connects the first fuel tank 18 and the second fuel tank 34. However, the connection tube 50 may be of a configuration not intended for fuel transfer between the first and second fuel tanks 18, 34 and may be positioned above the fill limit level of each tank to balance vapor pressure. In order to provide fuel from the second fuel tank 34 to the engine 22 concurrently as fuel is supplied from the first fuel tank 18 via the fuel pump 10, a jet pump 26 is provided to receive a first flow of fuel from the first fuel tank 18 and return a second flow, greater than the first flow, from the second fuel tank 34 to the first fuel tank 18. The jet pump 26 is a fluid pumping device that includes a converging-diverging nozzle configuration to convert pressure energy of a fluid to velocity energy. As shown in FIG. 1, the jet pump 26 can be positioned within the second fuel tank 34 and driven by a flow of fuel from the fuel pump 10.

The fuel pump 10 pumps fuel from the first fuel tank 18 to the second fuel tank 34 through a jet pump supply line 38. The jet pump supply line 38 can be coupled to and supplied with fuel via a branch 16 of the supply line 12 to the engine 22 as shown in FIG. 1. An outlet 39 of the jet pump supply line 38 is coupled to an inlet 40 of the jet pump 26. A jet pump return line 42 includes an inlet 28 coupled to an outlet 27 of the jet pump 26. The jet pump return line 42 extends from the jet pump outlet 27 to an outlet 29 positioned in the first fuel tank 18 so that fuel from the jet pump return line 42 is provided to the vicinity of the fuel pump 10 for supply to the engine 22. Although the particular construction of the jet pump 26 may vary, it should also be noted that the jet pump 26 includes a suction inlet 41 through which fuel is drawn from the volume of the second fuel tank 34 as the jet pump 26 operates.

A shut-off valve 46 is provided to selectively inhibit or regulate fuel flow returned to the first fuel tank 18 by the jet pump 26. The shut-off valve 46 can be positioned at the outlet 29 of the jet pump return line 42 and can be positioned within an upper portion of the first fuel tank 18. For example, the shut-off valve 46 can be positioned at a height corresponding to the fill limit level of the first fuel tank 18. In some constructions, the shut-off valve 46 can be positioned at or above a ¾ full level (as measured by volume or height). As discussed in further detail below, the shut-off valve 46 can be operable in some constructions to open and close the jet pump return line outlet 29.

As the jet pump 26 operates, fuel from the jet pump supply line 38 is accelerated to the jet pump outlet 27 and into the jet pump return line 42 along with the additional flow suctioned into the jet pump 26 through the suction inlet 41. Thus, the flow rate in the jet pump return line 42 is generally significantly higher than the flow rate in the jet pump supply line 38 (e.g., ten times as great). For example, the system can supply a fuel flow rate of 15 liters per hour (lph) within the jet pump supply line 38 and a returning flow rate of 120 lph within the jet pump return line 42 in some constructions. Although necessary to ensure that fuel is supplied to the engine 22 from both of the fuel tanks 18, 34, this differential in fuel flow rates will cause the first fuel tank 18 to overflow (i.e., causing fuel to flow into and through the connection tube 50), unless otherwise mitigated. The shut-off valve 46 is configured to selectively toggle between allowing and not allowing a large differential in flow rates between the jet pump supply and return lines 38, 42.

Figure 2A:
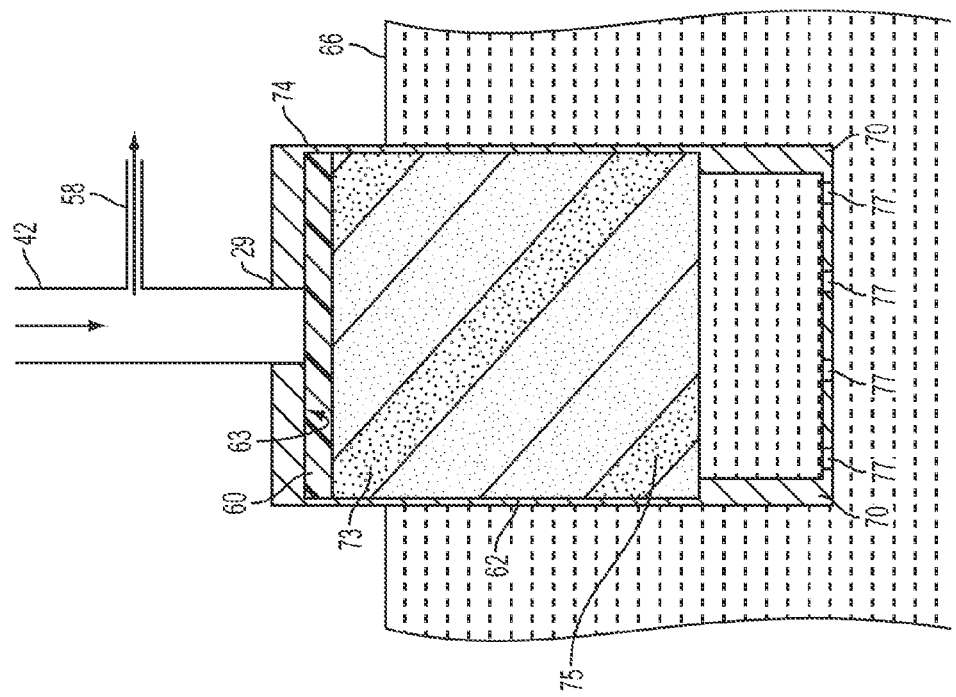
FIG. 2A is a cross-section view of the jet pump shut-off valve according to one construction of the invention, shown in an open position.
Figure 2B:
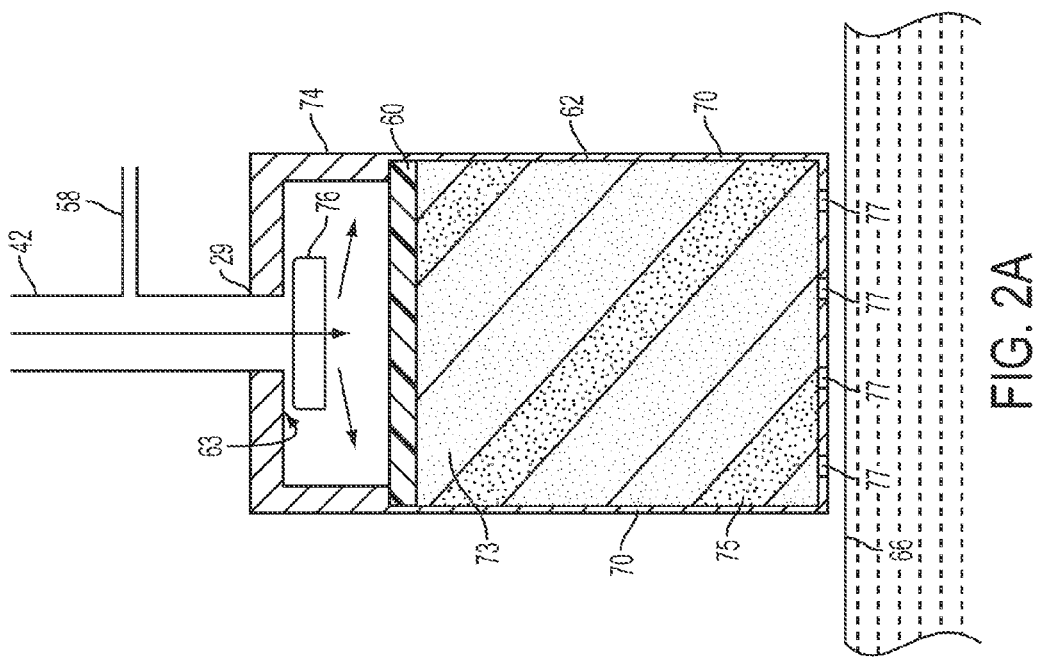
FIG. 2B is a cross-section view of the jet pump shut-off valve according to one construction of the invention, shown in a closed position.

The shut-off valve 46 of FIG. 1 is shown in further detail in FIGS. 2A and 2B. The shut-off valve 46 receives fuel from the jet pump return line 42 and selectively passes fuel to the first fuel tank 18. The shut-off valve 46 includes a valve housing 74 that contains a float 62 having buoyancy in the system fluid (e.g., diesel fuel). The valve housing 74 has one or more upper openings 76 and one or more lower openings 77 to allow substantially free fluid communication between the valve housing 74 and the primary fuel tank 18. The upper openings 76 can be provided around a cylindrical wall of the valve housing 74, located adjacent the jet pump return line outlet 29. The lower openings 77 can include a plurality of apertures in a bottom wall of the valve housing 74. However, other arrangements can be provided in other constructions. The float 62 includes an upper portion 73 and a lower portion 75. A sealing member 60 is provided on the upper portion 73 of the float 62. The sealing member 60 faces a surface 63 surrounding the jet pump return line outlet 29. The float 62 and the sealing member 60 can be positioned directly below the jet pump return line outlet 29. Due to the openings 76, 77, a fluid level 66 within the valve housing 74 changes in direct response to the fluid level 66 within the first fuel tank 18. When the fuel level 66 is below a shut-off valve toggle level, the float 62 is down as shown in FIG. 2A so that the seal member 60 is spaced from the surface 63 and the jet pump return line outlet 29 is open. When the fuel level 66 is at or above the shut-off valve toggle level, the float 62 rises by buoyancy to the position of FIG. 2B so that the seal member 60 is in contact with the surface to close the jet pump return line outlet 29. As illustrated, guide ribs 70 may be provided on interior side walls of the valve housing 74 to keep the float 62 centered. Alternate valve configurations may be provided to regulate the jet pump return line 42 in other constructions.

Although the outlet 29 of the jet pump return line 42 can be closed by the shut-off valve 46, flow through the jet pump return line 42 may not be completely halted. For example, a bypass outlet 58 can be provided in parallel with the jet pump return outlet 29 so that when the outlet 29 is closed, fuel flows into the first fuel tank 18 from the jet pump return line through the bypass outlet 58. The bypass outlet 58 can be provided as an orifice or other flow restriction having a size (e.g., diameter) calibrated to limit the flow rate through the jet pump return line 42 to a predetermined amount. For example, the bypass outlet 58 can be configured to restrict the flow in the jet pump return line 42 to closely match (i.e., be substantially equal to) the flow in the jet pump supply line 38 so that the effect of the jet pump 26 is partially or wholly cancelled and the net flow of fuel from the second fuel tank 34 to the first fuel tank 18 is reduced, in some cases to zero. In some constructions, the bypass outlet 58 has a diameter of about 2 mm.

Figure 5:
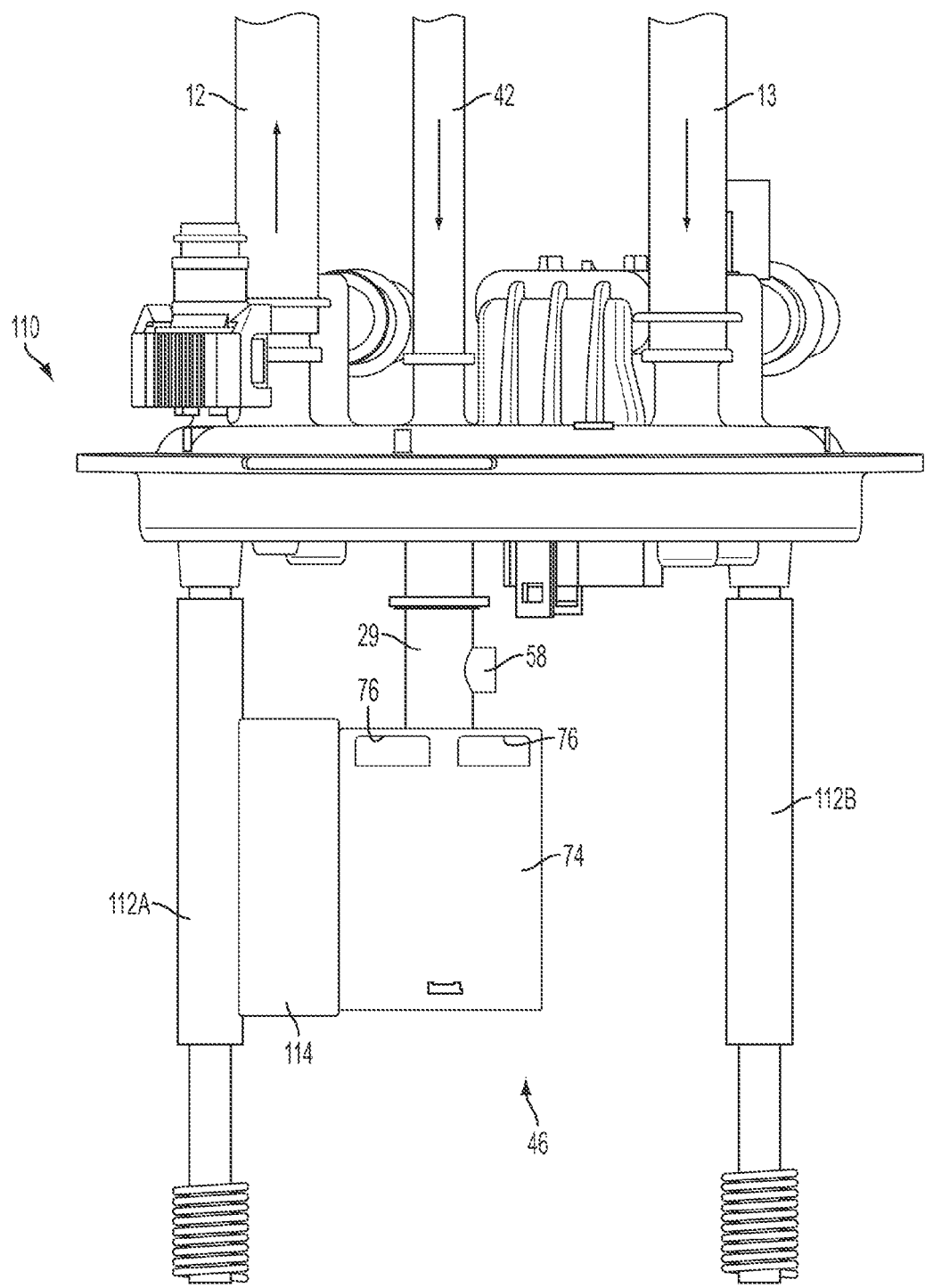
FIG. 5 is a front view of an upper flange of a pump module and an exemplary mounting of the jet pump shut-off valve.

The fuel pump 10 of FIG. 1 can be part of a pump assembly or module including an upper flange 110 as shown in FIG. 5. The upper flange includes integrated ports for attachment of each of the fuel supply line 12, the fuel return line 13, and the jet pump return line 42, and can optionally include additional ports for fluidly coupling with an external filter. The upper flange 110 is coupled to a lower assembly (not shown). The height between the lower assembly and the upper flange 110 (i.e., the "setup height") can be adjustable for different applications with resilient members arranged on guide rods extending between the upper flange 110 and the lower assembly. In the illustrated construction, a set of spring spacers 112A, 112B are provided on the respective guide rods to give the pump module a particular setup height. The shut-off valve 46, and more particularly the valve housing 74 of the shut-off valve, can be supported and laterally secured by coupling to one of the guide rods. For example, the valve housing 74 can be coupled to a first one of the spring spacers 112A, which is in turn coupled to and supported by the corresponding guide rod. In some constructions, the valve housing 74 is coupled to the spring spacer 112A via a connector 114. The connector 114 can be integrally formed with one or both of the spring spacer 112A and the valve housing 74, or otherwise secured in any desired manner to restrict the free movement of the valve housing 74 (e.g., as fuel within the first fuel tank 18 sloshes). In other constructions, the valve housing 74 is supported by the lower assembly of the pump module, or supported by a wall of the first fuel tank 18 rather than the pump module. In other constructions still, no designated lateral support is provided, and the shut-off valve 46 is simply coupled to the end of the jet pump return line 42, which may be a rigid member at the point of attachment with the shut-off valve 46.

Figure 3:
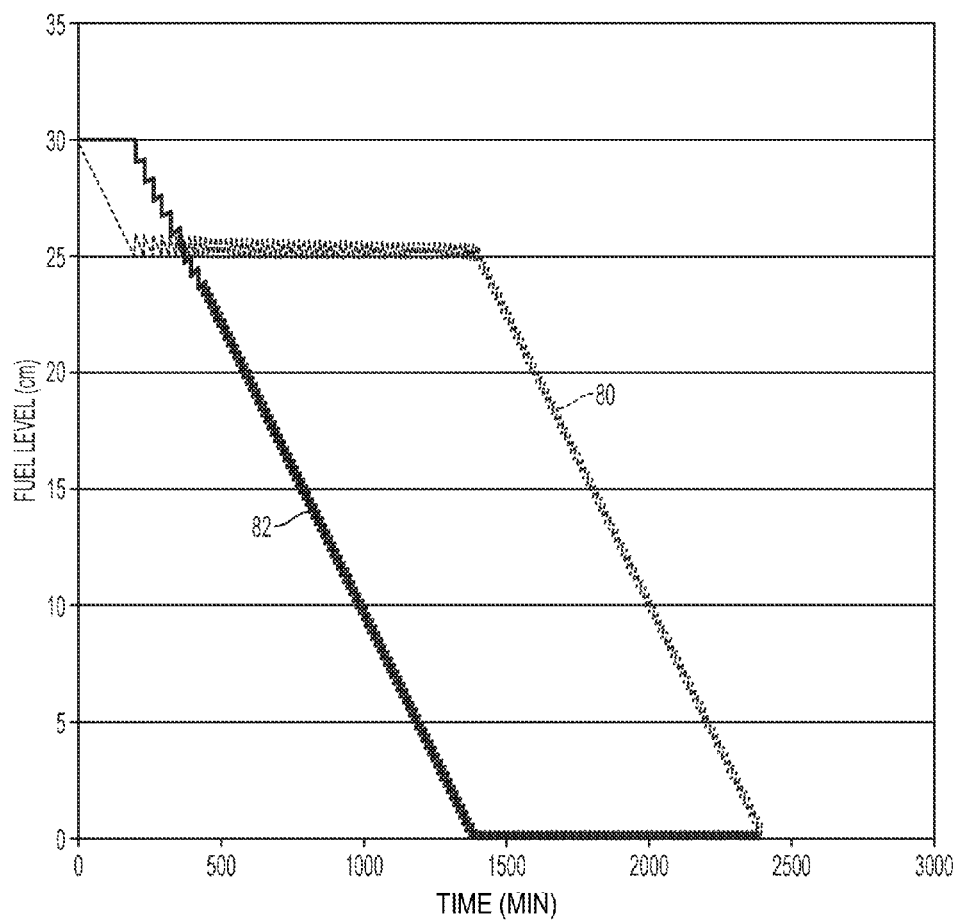
FIG. 3 is a plot of fuel level versus time for both fuel tanks at a first exemplary fuel consumption rate.
Figure 4:
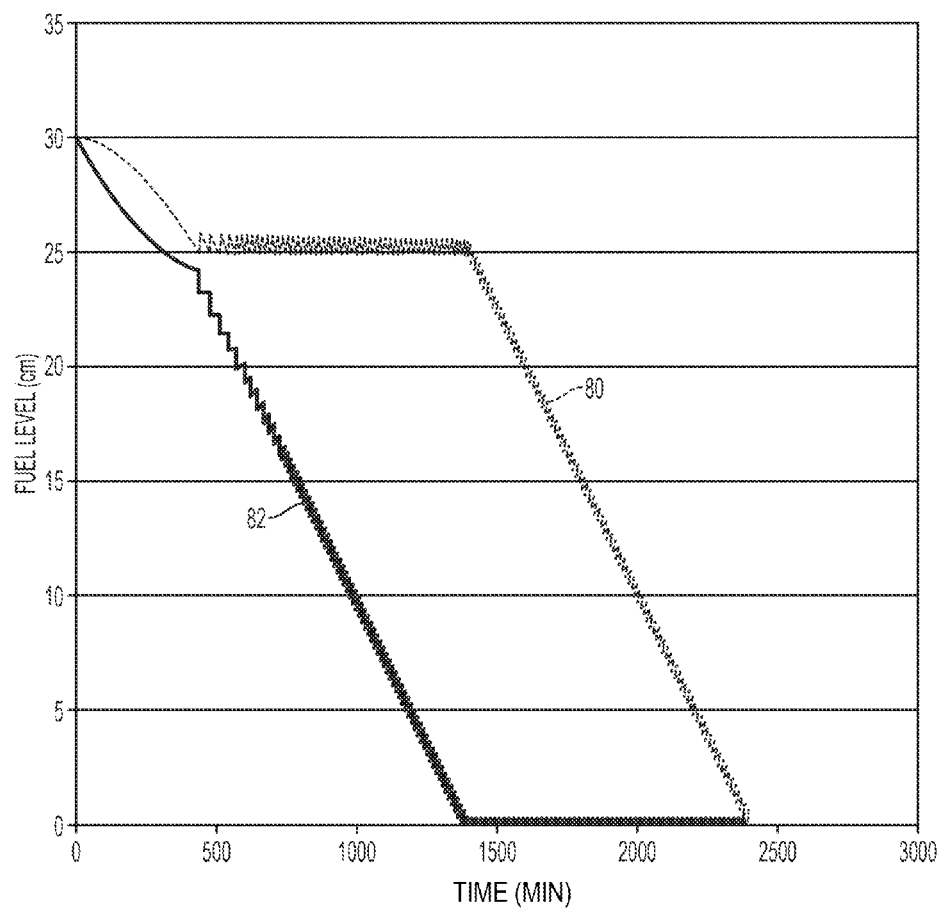
FIG. 4 is a plot of fuel level versus time for both fuel tanks at a second exemplary fuel consumption rate.

FIGS. 3 and 4 illustrate two exemplary fuel level relationships during emptying of the first and second fuel tanks 18, 34 with the fuel supply system 100 described above. In FIG. 3, a first plot line 80 corresponds to the fuel level 66 within the first fuel tank 18, and a second plot line 82 corresponds to a fuel level within the second fuel tank 34. Time is measured in minutes on the horizontal x-axis while the fuel levels in each of the first and second tanks 18, 34 are displayed in centimeters (cm) on the vertical y-axis. Valve toggle height relates to the instance when the shut-off valve 46 moves to an open position FIG. 2A from a closed position FIG. 2B or vice versa (i.e., when the seal member 60 makes or breaks the seal with the surface 63 around the jet pump return line outlet 29).

In FIG. 3, fuel flow rate through the jet pump return line 42 is exactly equal to the fuel flow rate through the jet pump supply line 38 when the shut-off valve 46 is closed. The engine 22 fuel consumption rate is a constant 4 lph. Maximum fuel level heights of both fuel tanks 18, 34 are 30 cm (at time zero). The valve toggle height is set to 25 cm. As time initiates, fuel from the first fuel tank 18 is consumed by the engine 22 and the shut-off valve 46 is closed. As such, the fuel level 66 of the first fuel tank 18 decreases due to engine 22 consumption while the fuel level of the second fuel tank 34 remains at full. As time continues, the fuel level 66 of the first fuel tank 18 reaches the valve toggle height and the shut-off valve 46 first moves from closed to open. As such, the fuel level of the second fuel tank 34 begins to decrease while the fuel level 66 of the first fuel tank 18 stays at or around a consistent level (i.e., the valve toggle height) as the shut-off valve 46 toggles between open and closed. This continues until the second fuel tank 34 reaches a minimal level of fuel, from which time the fuel level 66 of the first fuel tank 18 begins to decrease from the valve toggle height. The decrease in fuel level 66 within the first fuel tank 18 continues until the first fuel tank 18 also reaches a minimal fuel level. It should be noted throughout the entire time, the flow rate of fuel through the connection tube 50 is maintained at zero.

In the example of FIG. 4, the fuel flow rate through the jet pump return line 42 is 4 lph higher than the fuel flow rate through the jet pump supply line 38, so that the jet pump effect is reduced but not completely offset by the shut-off valve 46. As with the example of FIG. 3, the engine 22 fuel consumption rate is a constant 4 lph, maximum fuel levels of both fuel tanks 18, 34 are 30 cm, and the valve toggle height is 25 cm. Initially, with the shut-off valve 46 closed due to the fuel level 66 in the first fuel tank 18, fuel levels in both fuel tanks 18, 34 decrease together, the secondary tank level decreasing faster than that of the first fuel tank 18, until the first fuel tank 18 reaches the valve toggle height and the shut-off valve 46 first opens to allow full flow through the jet pump return line 42. As time continues from this point, the fuel level 66 of the first fuel tank 18 stays at or around a consistent level (i.e., the valve toggle height) as the shut-off valve 46 toggles between open and closed while the level of fuel in the second fuel tank 34 continues to decrease. This continues until the second fuel tank 34 reaches a minimal level of fuel, from which time the fuel level 66 of the first fuel tank 18 begins to decrease from the valve toggle height. The decrease in the fuel level 66 within the first fuel tank 18 continues until the first fuel tank 18 also reaches a minimal fuel level. It should be noted throughout the entire time, the flow rate of fuel through the connection tube 50 is maintained at zero.

Various features and advantages of the invention are set forth in the following claims.

What is claimed is:

1. A fuel supply system comprising:
a fuel pump configured to pump fuel from a first fuel storage location to an engine;
a jet pump configured to receive an auxiliary supply of fuel from the fuel pump and to return the auxiliary supply of fuel plus an additional flow of fuel drawn from a second fuel storage location to the first fuel storage location;
a jet pump supply line having an inlet in fluid communication with an outlet of the fuel pump and having an outlet coupled to an inlet of the jet pump;
a jet pump return line having an input coupled to an outlet of the jet pump and having an outlet adjacent the fuel pump in the first fuel storage location; and
a shut-off valve operable at the outlet of the jet pump return line to selectively limit a return fuel flow provided by the jet pump and discharged from the outlet of the jet pump return line into the first fuel storage location, wherein the shut-off valve is operable to move from an open position to a closed position in response to a fuel level in the first fuel storage location surpassing a threshold,
wherein the outlet of the jet pump return line is a primary outlet, the jet pump return line further including a bypass outlet that remains open to provide a restricted jet pump return flow into the first fuel storage location when the shut-off valve is in the closed position.

2. The fuel supply system of claim 1, wherein the bypass outlet consists of an orifice calibrated to limit the flow rate through the jet pump return line to be approximately equal to the flow through the jet pump supply line.

3. The fuel supply system of claim 1, wherein the bypass outlet consists of an orifice having a diameter of about 2 millimeters.

4. The fuel supply system of claim 1, wherein the shut-off valve includes a float configured to be buoyant in the fuel at the first fuel storage location so that an upper portion remains above the fuel level and a lower portion is submerged in the fuel, the float including a seal member positioned on the upper portion and arranged directly below the outlet of the jet pump return line.

5. The fuel supply system of claim 4, wherein the seal member is configured to selectively establish a fluid seal with a surface surrounding the outlet of the jet pump return line to close the outlet.

6. The fuel supply system of claim 4, wherein the float is configured to move vertically in response to fuel level within the first fuel storage location between a closed position, corresponding to the closed position of the shut-off valve, in which the seal member closes the outlet of the jet pump return line and an open position, corresponding to the open position of the shut-off valve, in which the seal member is spaced from the outlet of the jet pump return line.

7. The fuel supply system of claim 1, wherein the shut-off valve is coupled to a guide rod of a pump module containing the fuel pump.

8. A fuel supply system comprising:
a first fuel tank configured to contain a first volume of fuel;
a second fuel tank configured to contain a second volume of fuel separate and spaced from the first volume of fuel, such that the first and second fuel tanks do not share a common fuel volume, wherein the second fuel tank has no fuel pump;
a fuel pump provided in the first fuel tank and configured to draw fuel from the first fuel tank for supplying to an engine;
a jet pump positioned in the second fuel tank, the jet pump being coupled with a jet pump supply line from the first tank to the second tank and a jet pump return line from the second tank to the first tank; and
a shut-off valve positioned in the first tank at an outlet of the jet pump return line, wherein the shut-off valve is operable to selectively limit a return fuel flow provided by the jet pump through the jet pump return line from the second tank to the first tank.

9. The fuel supply system of claim 8, wherein the shut-off valve is operable to move from an open position to a closed position in response to fuel level within the first fuel tank reaching a threshold level.

10. The fuel supply system of claim 9, wherein the threshold level is over 75 percent of a fill limit level.

11. The fuel supply system of claim 10, wherein the threshold level is not more than the fill limit level.

12. The fuel supply system of claim 8, wherein the outlet of the jet pump return line is a primary outlet, the jet pump return line further including a bypass outlet that remains open regardless of the shut-off valve condition.

13. The fuel supply system of claim 12, wherein the bypass outlet consists of an orifice calibrated to limit the flow rate through the jet pump return line to be approximately equal to the flow through the jet pump supply line.

14. The fuel supply system of claim 12, wherein the bypass outlet consists of an orifice having a diameter of about 2 millimeters.

15. The fuel supply system of claim 8, wherein the shut-off valve includes a float configured to be buoyant in the fuel so that an upper portion remains above the fuel level and a lower portion is submerged in the fuel, the float including a seal member positioned on the upper portion and arranged directly below the outlet of the jet pump return line.

16. The fuel supply system of claim 15, wherein the seal member is configured to establish a fluid seal with a surface surrounding the outlet of the jet pump return line when the fuel level within the first fuel tank reaches a threshold level.

17. The fuel supply system of claim 15, wherein the float is configured to move vertically in response to fuel level within the first tank between a closed position in which the seal member closes the outlet of the jet pump return line and an open position in which the seal member is spaced from the outlet of the jet pump return line.

18. The fuel supply system of claim 8, wherein the shut-off valve is coupled to a guide rod of a pump module containing the fuel pump.

\* \* \* \* \*